US012645294B2

(12) United States Patent
Lee et al.

(10) Patent No.: US 12,645,294 B2
(45) Date of Patent: Jun. 2, 2026

(54) DISPLAY MODULE CONTROL METHOD AND ELECTRONIC DEVICE FOR CARRYING OUT SAME

(71) Applicant: Samsung Electronics Co., Ltd., Suwon-si (KR)

(72) Inventors: Eunbin Lee, Suwon-si (KR); Eunyoung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/049,573

(22) Filed: Feb. 10, 2025

(65) Prior Publication Data

US 2025/0181158 A1 Jun. 5, 2025

Related U.S. Application Data

(63) Continuation of application No. PCT/KR2023/012182, filed on Aug. 17, 2023.

(30) Foreign Application Priority Data

Aug. 26, 2022 (KR) ........................ 10-2022-0107775
Oct. 13, 2022 (KR) ........................ 10-2022-0131602

(51) Int. Cl.
*G06F 3/01* (2006.01)
*G09G 3/32* (2016.01)

(52) U.S. Cl.
CPC ............... *G06F 3/013* (2013.01); *G09G 3/32* (2013.01); *G09G 2354/00* (2013.01)

(58) Field of Classification Search
None
See application file for complete search history.

(56) References Cited

U.S. PATENT DOCUMENTS 9,129,430 B2 9/2015 Salter
10,338,392 B2 7/2019 Kohler et al.
(Continued)

FOREIGN PATENT DOCUMENTS

AU 2018256365 A1 10/2019
CN 105283825 1/2016
(Continued)

OTHER PUBLICATIONS

Microsoft Learn, Billboarding and tag-along, Online: https://docs. microsoft.com/en-us/windows/mixed-reality/design/ billboardingand- tag-along, 2 pages, Nov. 30, 2021.
(Continued)

*Primary Examiner* — Aneeta Yodichkas
(74) *Attorney, Agent, or Firm* — NIXON & VANDERHYE P.C.

(57) ABSTRACT

An electronic device, may comprise: a display module including a display; at least one processor, comprising processing circuitry; and memory stores instructions executable by the processor, when the instructions are executed by the at least one processor, control the display module to, in a determined location in at least one among the real world and a virtual world, display first information on at least one first surface of a virtual object, and display second information on at least one second surface of the virtual object; determine the gaze direction of a user based on the location of the user in at least one among the real world and the virtual world; and based on the gaze direction of the user, control the display module to display the first information on the at least one second surface.

15 Claims, 10 Drawing Sheets

(56) References Cited

U.S. PATENT DOCUMENTS

| | | |
|---|---|---|
| 2015/0277699 A1 | 10/2015 | Algreatly |
| 2017/0061700 A1 | 3/2017 | Urbach et al. |
| 2017/0103583 A1 | 4/2017 | Poulos et al. |
| 2020/0258481 A1 | 8/2020 | Woo et al. |
| 2021/0165484 A1 | 6/2021 | Suguhara et al. |
| 2021/0286502 A1 | 9/2021 | Lemay et al. |
| 2022/0197377 A1 | 6/2022 | Kim et al. |
| 2024/0104883 A1* | 3/2024 | Hashimoto ........... G06F 3/0481 |

FOREIGN PATENT DOCUMENTS

| | | |
|---|---|---|
| CN | 112219205 A | 1/2021 |
| JP | 2021527247 A | 10/2021 |
| KR | 20160128119 A | 11/2016 |
| KR | 20170126295 A | 11/2017 |
| KR | 102212250 B1 | 1/2021 |
| KR | 102280719 B1 | 7/2021 |
| KR | 20220088496 A | 6/2022 |
| WO | 2018195099 A1 | 10/2018 |
| WO | WO-2022123750 A1* | 6/2022 ............ G06V 20/64 |
| WO | 2022173724 A1 | 8/2022 |

OTHER PUBLICATIONS

Microsoft Learn, Spatial anchors, Online: https://docs.microsoft.com/en-us/windows/mixed-reality/design/spatial-anchors, 4 pages, Mar. 3, 2023.

International Search Report for PCT/KR2023/012182 mailed Nov. 8, 2023, 5 pages with English translation.

Written Opinion of the ISA for PCT/KR2023/012182 mailed Nov. 8, 2023, 5 pages.

European Search Report dated Oct. 15, 2025 issued in European Patent Application No. 23857645.8, 9 pp.

Korean Office Action issued on Jan. 31, 2026 for Korean application No. 10-2022-0131602 with translation.

Chinese Office Action issued by the Chinese Patent Office on Mar. 17, 2026, for the corresponding CN Patent Application No. 202380062456.8 (with English language translation).

Office Action issued by the Indian Patent Office on Apr. 13, 2026, for the corresponding Indian Patent Application No. 202547010179.

* cited by examiner

DISPLAY MODULE CONTROL METHOD AND ELECTRONIC DEVICE FOR CARRYING OUT SAME

CROSS-REFERENCE TO RELATED APPLICATIONS

This application is a continuation of International Application No. PCT/KR2023/012182 designating the U.S., filed on Aug. 17, 2023, in the Korean Intellectual Property Receiving Office and claiming priority to Korean Patent Application Nos. 10-2022-0107775, filed on Aug. 26, 2022, and 10-2022-0131602, filed on Oct. 13, 2022, in the Korean Intellectual Property Office, the disclosures of each of which are incorporated by reference herein in their entireties.

BACKGROUND

Field

The disclosure relates to a method of controlling a display module that displays a virtual object in an augmented reality (AR) or virtual reality (VR) mode, and an electronic device performing the method.

Description of Related Art

An electronic device that displays virtual objects on a display module in an augmented reality (AR) mode or a virtual reality (VR) mode may employ spatial anchoring, which anchors a position of a virtual object to a specific position.

A virtual object anchored at a specific position may have a window that transmits information to a position of a user at a time the virtual object is anchored.

In a case where the user of the electronic device moves away from the position at which the virtual object is anchored, and the information provided by the virtual object through the window changes or a notification occurs, the user may release the anchored position of the virtual object or move to the position where the virtual object is anchored to identify the new information or notification.

SUMMARY

According to various example embodiments, an electronic device may include: a display module including a display; at least one processor, comprising processing circuitry; and memory storing instructions executable by the at least one processor. When the instructions are executed by the at least one processor individually or collectively, cause the electronic device to control the display module to display first information on at least one first surface of a virtual object and second information on at least one second surface of the virtual object, at a determined position in at least one of a real world or a virtual world. When the instructions are executed by the at least one processor individually or collectively, cause the electronic device to determine a gaze direction of a user, based on a position of the user in the real world or the virtual world. In response to the gaze direction of the user being a direction corresponding to the at least one second surface, when the instructions are executed by the at least one processor individually or collectively, cause the electronic device to control the display module to display the first information on the at least one second surface.

According to various example embodiments, an electronic device may include: a display module including a display; at least one processor, comprising processing circuitry; and memory storing instructions executable by the at least one processor. When the instructions are executed by the at least one processor individually or collectively, cause the electronic device to identify a first position of a user in at least one of a real world or a virtual world. When the instructions are executed by the at least one processor individually or collectively, cause the electronic device to control the display module to display first information on at least one first surface of a virtual object and second information on at least one second surface of the virtual object, at a determined position in the real world or the virtual world, in response to the first position. When the instructions are executed by the at least one processor individually or collectively, cause the electronic device to identify a second position of the user in the real world or the virtual world. In response to a gaze direction of the user being a direction corresponding to the at least one second surface, when the instructions are executed by the at least one processor individually or collectively, cause the electronic device to control the display module to display the first information on the at least one second surface, based on a distance and direction between the determined position and the second position.

According to various example embodiments, a method of controlling display module may include: controlling a display module, comprising a display, to display first information on at least one first surface of a virtual object and second information on at least one second surface of the virtual object, at a determined position in at least one of a real world or a virtual world; determining a gaze direction of a user, based on a position of the user in the real world or the virtual world; and in response to the gaze direction of the user being a direction corresponding to the at least one second surface, controlling the display module to display the first information on the at least one second surface.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a diagram illustrating an example first surface of a virtual object according to various embodiments;

DETAILED DESCRIPTION

Figure 1:
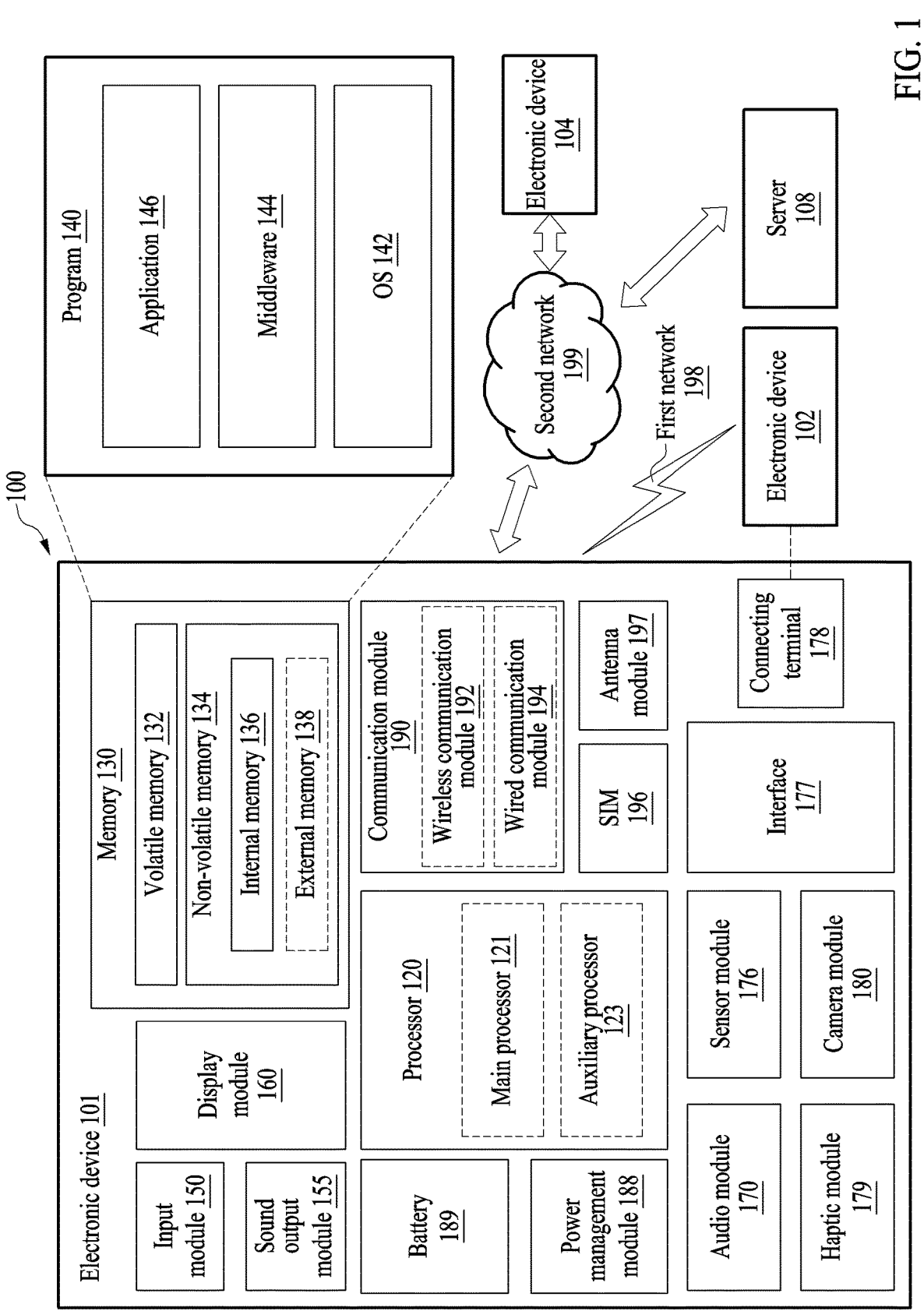
FIG. 1 is a block diagram illustrating an example electronic device in a network environment according to various embodiments.

Hereinafter, various example embodiments will be described in greater detail with reference to the accompanying drawings. When describing the various embodiments with reference to the accompanying drawings, like reference numerals refer to like elements.

As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, at least one sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and control circuitry to control its corresponding one of the display, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

The antenna module 197 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the components described above may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI).

According to an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. According to an embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
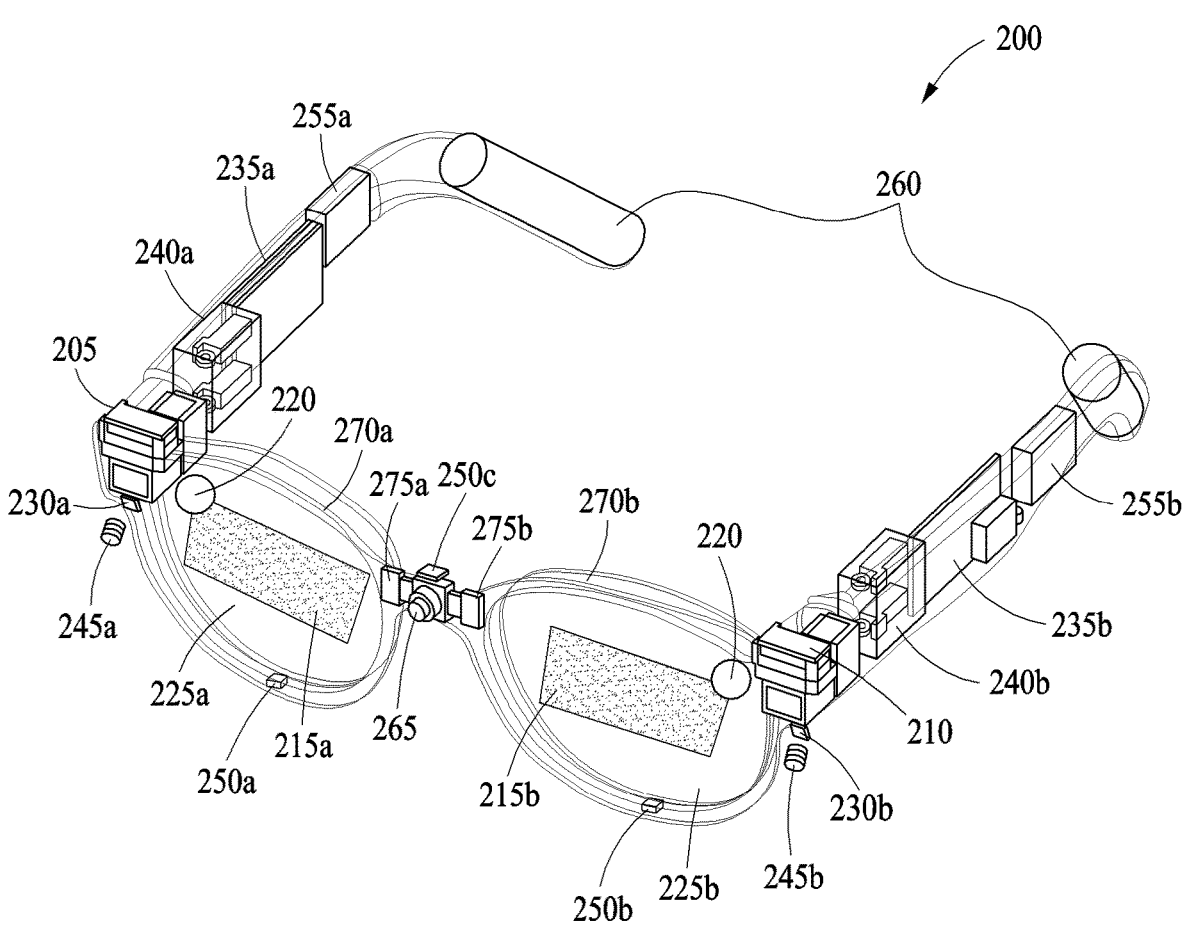
FIG. 2 is a perspective view illustrating an example configuration of a wearable electronic device according to various embodiments.

FIG. 2 is a perspective view illustrating an example configuration of a wearable electronic device 200 according to various embodiments.

Referring to FIG. 2, the wearable electronic device 200 (e.g., the electronic device 101 of FIG. 1) may be worn on a face of a user to provide the user with images associated with an augmented reality (AR) service and/or a virtual reality (VR) service.

In an embodiment, the wearable electronic device 200 may include a first display 205, a second display 210, a screen display portion 215*a*, 215*b*, an input optical member 220, a first transparent member 225*a*, a second transparent member 225*b*, lighting units 230*a* and 230*b*, a first printed circuit board (PCB) 235*a*, a second PCB 235*b*, a first hinge 240*a*, a second hinge 240*b*, first cameras 245*a* and 245*b*, a plurality of microphones (e.g., a first microphone 250*a*, a second microphone 250*b*, and a third microphone 250*c*), a plurality of speakers (e.g., a first speaker 255*a* and a second speaker 255*b*), a battery 260, second cameras 275*a* and 275*b*, a third camera 265, and visors 270*a* and 270*b*.

In an embodiment, a display (e.g., the first display 205 and the second display 210) may include, for example, a liquid crystal display (LCD), a digital mirror device (DMD), a liquid crystal on silicon (LCoS), an organic light-emitting diode (OLED), a micro light-emitting diode (micro-LED), or the like. Although not shown, when the display is one of an LCD, a DMD, and an LCOS, the wearable electronic device 200 may include a light source configured to emit light to a screen output area of the display. In an embodiment, when the display is capable of generating light by itself, for example, when the display is either an OLED or a micro-LED, the wearable electronic device 200 may provide the user with virtual images of a relatively high quality even though a separate light source is not included. For example, when the display is implemented as an OLED or a micro-LED, a light source may be unnecessary, which may lead to lightening of the wearable electronic device 200. Hereinafter, a display capable of generating light by itself may be referred to as a "self-luminous display," and the description thereof will be made on the assumption of the self-luminous display.

The display (e.g., the first display 205 and the second display 210) according to various embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display includes a micro-LED.

However, embodiments are not limited thereto. A single pixel may include R, G, and B, and a single chip may be implemented by a plurality of pixels including R, G, and B pixels.

In an embodiment, the display (e.g., the first display 205 and the second display 210) may include a display area including pixels for displaying a virtual image, and light-receiving pixels (e.g., photo sensor pixels) that receive the light reflected from eyes disposed among pixels, convert the reflected light into electrical energy, and output the electrical energy.

In an embodiment, the wearable electronic device 200 (e.g., the processor 120 of FIG. 2) may detect a gaze direction (e.g., pupil movement) of the user through the light-receiving pixels. For example, the wearable electronic device 200 may detect and track a gaze direction of a right eye of the user and a gaze direction of a left eye of the user, via one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze) detected via the one or more light-receiving pixels.

In an embodiment, light emitted from the display (e.g., the first display 205 and the second display 210) may reach the screen display portion 215a formed on the first transparent member 225a that faces the right eye of the user, and the screen display portion 215b formed on the second transparent member 225b that faces the left eye of the user, by passing through a lens (not shown) and a waveguide. For example, the light emitted from the display (e.g., the first display 205 and the second display 210) may be reflected from a grating area formed on the input optical member 220 and the screen display portion 215a and/or 215b to be transferred to the eyes of the user, by passing through the waveguide. The first transparent member 225a and/or the second transparent member 225b may be formed as, for example, a glass plate, a plastic plate, or a polymer, and may be transparently or translucently formed.

In an embodiment, the lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an embodiment, the screen display portion 215a, 215b or the transparent members (e.g., the first transparent member 225a and the second transparent member 225b) may include a lens including a waveguide and a reflective lens.

In an embodiment, the waveguide may be formed of glass, plastic, or a polymer, and may have a nanopattern formed on one surface of the inside or outside thereof, for example, a grating structure of a polygonal or curved shape. According to an embodiment, light incident onto one end of the waveguide may be propagated inside the display waveguide by the nanopattern to be provided to the user. In an embodiment, the waveguide formed as a free-form prism may provide incident light to the user via a reflection mirror. The waveguide may include at least one of diffractive elements (e.g., a diffractive optical element (DOE) or a holographic optical element (HOE)) or at least one (e.g., a reflection mirror) of reflective elements. In an embodiment, the waveguide may guide light emitted from the display (e.g., the first display 205 and the second display 210) to the eyes of the user, using at least one diffractive element or reflective element included in the waveguide.

According to various embodiments, the diffractive element may include the input optical member 220 and/or an output optical member (not shown). For example, the input optical member 220 may refer to an input grating area, and the output optical member (not shown) may refer to an output grating area. The input grating area may function as an input terminal to diffract (or reflect) light output from the display (e.g., the first display 205 and the second display 210) (e.g., a micro-LED) to transmit the light to the transparent members (e.g., the transparent member 225a and the second transparent member 225b) of the screen display portion 215a, 215b. The output grating area may function as an exit to diffract (or reflect), to the eyes of the user, the light transmitted to the transparent members (e.g., the first transparent member 225a and the second transparent member 225b) of the waveguide.

According to various embodiments, the reflective element may include a total reflection optical element or a total reflection waveguide for total internal reflection (TIR). For example, TIR, which is one of schemes for inducing light, may form an angle of incidence such that light (e.g., a virtual image) input through the input grating area is totally (e.g., 100%) reflected from one surface (e.g., a specific surface) of the waveguide, to completely transmit the light to the output grating area.

In an embodiment, a light path of the light emitted from the display (e.g., the first display 205 and the second display 210) may be guided by the waveguide through the input optical member 220. The light traveling in the waveguide may be guided toward the eyes of the user through the output optical member. The screen display portion 215a, 215b may be determined based on the light emitted toward the eyes.

In an embodiment, the first cameras 245a and 245b may include a camera used for three degrees of freedom (3DoF) and six degrees of freedom (6DoF) head tracking, hand detection and tracking, and gesture and/or space recognition. For example, the first cameras 245a and 245b may include a global shutter (GS) camera to detect a movement of a head or a hand and track the movement.

For example, the first cameras 245a and 245b may use a stereo camera for head tracking and space recognition, and cameras with the same specifications and performance may be applied thereto. The first cameras 245a and 245b may use a GS camera having excellent performance (e.g., image dragging) to detect a fine movement, such as, fast hand and finger movements, and track the movements.

For example, the first cameras 245a and 245b may use a rolling shutter (RS) camera. The first cameras 245a and 245b may perform a simultaneous localization and mapping (SLAM) function for 6DoF space recognition and depth imaging. The first cameras 245a and 245b may also perform a user gesture recognition function.

In an embodiment, the second cameras 275a and 275b may be used to detect and track the pupils. The second cameras 275a and 275b may also be referred to as an eye-tracking (ET) camera. The second cameras 275a and 275b may track a gaze direction of the user. Based on the gaze direction of the user, the wearable electronic device 200 may allow a center of a virtual image projected on the screen display portion 215a, 215b to be disposed according to the gaze direction of the user.

The second cameras 275a and 275b may use a GS camera to detect the pupils and track fast pupil movements. The second cameras 275a and 275b may be installed for the left eye or the right eye, respectively, and cameras with the same specifications and performance may be used for the second cameras 275a and 275b for the left eye and the right eye.

In an embodiment, the second cameras 275a and 275b may include a gaze tracking sensor. For example, the wearable electronic device 200 may further include a lighting unit, and the gaze tracking sensor may detect reflected light of infrared light projected onto the eyes of the user from the lighting unit. For example, the gaze tracking sensor may track a gaze direction of the user, using the reflected light.

In an embodiment, the third camera 265 may also be referred to as a "high-resolution (HR)" or a "photo video (PV)" camera and may include an HR camera. The third camera 265 may include a color camera having functions for obtaining a high-quality image, such as, for example, an automatic focus (AF) function and an optical image stabi-lizer (OIS). However, examples are not limited thereto, and the third camera 265 may include a GS camera or an RS camera.

In an embodiment, at least one sensor (e.g., a gyro sensor, an acceleration sensor, a geomagnetic sensor, a touch sensor, an illuminance sensor, and/or a gesture sensor) and the first cameras 245a and 245b may perform at least one of the functions such as 6DoF head tracking, pose estimation and prediction, gesture and/or space recognition, and SLAM through depth imaging.

In an embodiment, the first camera 245a and 245b may use separate cameras—a camera for head tracking and a camera for hand tracking.

In an embodiment, the lighting units 230a and 230b may be used differently according to positions in which the light units 230a and 230b are attached. For example, the lighting units 230a and 230b may be attached together with the first cameras 245a and 245b provided around a hinge (e.g., the first hinge 240a and the second hinge 240b) that connects a frame and a temple or around a bridge that connects frames. For example, when a GS camera is used to capture an image, the lighting units 230a and 230b may be used to supplement surrounding brightness. For example, the lighting units 230a and 230b may be used in a dark environment or when it is not easy to detect a subject to be captured due to reflected light and a mixture of various light sources.

In an embodiment, the lighting units 230a and 230b attached to the periphery of the frame of the wearable electronic device 200 may be an auxiliary means for facili-tating the detection of an eye gaze direction when using the second cameras 275a and 275b to capture the pupils. When the lighting units 230a and 230b are used as an auxiliary means for detecting the gaze direction, they may include an IR LED of an IR wavelength.

In an embodiment, on a PCB (e.g., the first PCB 235a and the second PCB 235b), components (e.g., the processor 120 and the memory 130 of FIG. 1) included in the wearable electronic device 200 may be disposed. The PCB may transmit electrical signals to the components included in the wearable electronic device 200.

In an embodiment, the plurality of microphones (e.g., the first microphone 250a, the second microphone 250b, and the third microphone 250c) may process an external acoustic signal into electrical audio data. The electrical audio data may be used in various ways according to a function (or an application being executed) being performed by the wear-able electronic device 200.

In an embodiment, the plurality of speakers (e.g., the first speaker 255a and the second speaker 255b) may output audio data that is received from a communication circuit (e.g., a communication circuit 210 of FIG. 2) or stored in a memory (e.g., the memory 130 of FIG. 1).

In an embodiment, the battery 260 may be provided as one or more batteries, and may supply power to the com-ponents included in the wearable electronic device 200.

In an embodiment, the visors 270a and 270b may adjust a transmittance amount of external light incident on the eyes of the user according to a transmittance. The visors 270a and 270b may be disposed before or behind the screen display portion 215a, 215b. The front side of the screen display portion 215a, 215b may indicate a direction opposite the user wearing the wearable electronic device 200, and the rear side thereof may indicate a direction on the user's side of the user wearing the electronic device 200. The visors 270a and 270b may protect the screen display portion 215a, 215b and adjust the transmittance amount of external light.

For example, the visors 270a and 270b may include a control module and an electrochromic element. The control module may control the electrochromic element to adjust a transmittance of the electrochromic element.

Figure 3:
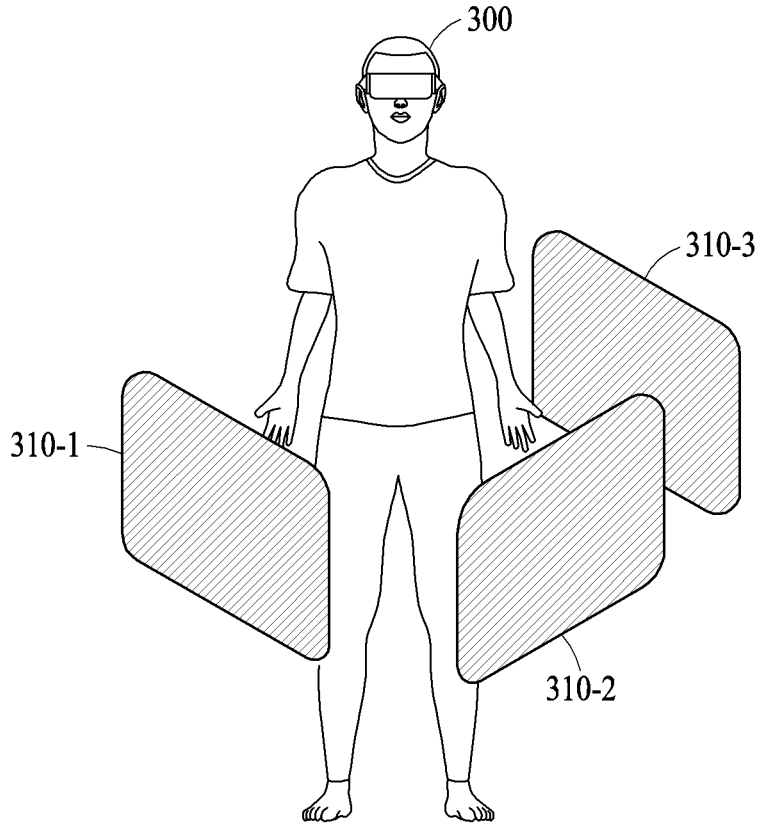
FIG. 3 is a diagram illustrating an example operation performed by an electronic device to anchor a position of a virtual object according to various embodiments.

FIG. 3 is a diagram illustrating an example operation performed by an electronic device 300 (e.g., the electronic device 101 of FIG. 1 and the electronic device 200 of FIG. 2) to control a display module (e.g., the display module 160 of FIG. 1, and the first display 205 and the second display 210 of FIG. 2) to display a virtual object (e.g., 310-1, 310-2, and 310-3) at a determined position of at least one of a real world or a virtual world, according to various embodiments.

Referring to FIG. 3, the electronic device 300 may display at least one virtual object (e.g., 310-1, 310-2, and 310-3) on the display module (e.g., 205 and 210). For example, the electronic device 300 may control the display module (e.g., 205 and 210) to display the virtual object (e.g., 310-1, 310-2, and 310-3) such that a user may recognize that as if the virtual object (e.g., 310-1, 310-2, and 310-3) is displayed in the real world or the virtual world, as shown in FIG. 3. The electronic device 300 may control the display module (e.g., 205 and 210) to display the virtual object (e.g., 310-1, 310-2, and 310-3) in an AR mode or a VR mode.

For example, the electronic device 300 set in the AR mode may control the display module (e.g., 205 and 210) to display the virtual object (e.g., 310-1, 310-2, and 310-3) at a determined position in the real world. For example, the electronic device 300 set in the VR mode may control the display module (e.g., 205 and 210) to display the virtual object (e.g., 310-1, 310-2, and 310-3) at a determined position in the virtual world.

For example, the electronic device 300 may change from the AR mode to the VR mode, or conversely from the VR mode to the AR mode. In this example, in response to such a mode change, the electronic device 300 may control the display module (e.g., 205 and 210) such that a position at which the virtual object (e.g., 310-1, 310-2, and 310-3) is to be displayed is changed. For example, in response to a change from the VR mode to the AR mode, the electronic device 300 may control the display module (e.g., 205 and 210) to display the virtual object (e.g., 310-1, 310-2, and 310-3) at a determined position in the real world correspond-ing to a determined position of the virtual world. For example, contrary to the preceding example, in response to a change from the AR mode to the VR mode, the electronic device 300 may operate substantially the same as described above.

According to an embodiment, the electronic device 300 anchor a position of the at least one virtual object (e.g., 310-1, 310-2, and 310-3). For example, the electronic device 300 may perform spatial anchoring to anchor the position of the virtual object (e.g., 310-1, 310-2, and 310-3) such that the virtual object (e.g., 310-1, 310-2, and 310-3) is displayed at a specific position.

For example, when the anchored position of the virtual object (e.g., 310-1, 310-2, and 310-3) is within a field of view (FOV) of the user, the electronic device 300 may control the display module (e.g., 205 and 210) to display the virtual object (e.g., 310-1, 310-2, and 310-3).

For example, when the anchored position of the virtual object (e.g., 310-1, 310-2, and 310-3) is not within the FOV of the user, the electronic device 300 may control the display module (e.g., 205 and 210) not to display the virtual object (e.g., 310-1, 310-2, and 310-3).

For example, the electronic device 300 may anchor the position of the virtual object (e.g., 310-1, 310-2, and 310-3) based on a position of the user at a time of anchoring the position of the virtual object (e.g., 310-1, 310-2, and 310-3). For example, the electronic device 300 may anchor the position of the virtual object (e.g., 310-1, 310-2, and 310-3) based on a position of the user in the real world. For example, the electronic device 300 may anchor the position of the virtual object (e.g., 310-1, 310-2, and 310-3) based on a position in the virtual world corresponding to the position of the user.

For example, in the AR mode, the electronic device 300 may anchor the position of the virtual object (e.g., 310-1, 310-2, and 310-3) based on the position of the user in the real world. In this example, when the user views the anchored position of the virtual object (e.g., 310-1, 310-2, and 310-3), the electronic device 300 may control the display module (e.g., 205 and 210) to display the virtual object (e.g., 310-1, 310-2, and 310-3). In this example, when the user does not view the anchored position of the virtual object (e.g., 310-1, 310-2, and 310-3), the electronic device 300 may control the display module (e.g., 205 and 210) not to display the virtual object (e.g., 310-1, 310-2, and 310-3).

Based on a gaze direction of the user and a viewing range (e.g., FOV) of the user, the electronic device 300 may control the display module (e.g., 205 and 210) to display, partially or fully, the virtual object (e.g., 310-1, 310-2, and 310-3) of which the position is anchored. For example, the electronic device 300 may use a camera module (e.g., the camera module 180 of FIG. 1, and the first cameras 245*a* and 245*b* of FIG. 2) to perform head tracking and identify the gaze direction of the user.

For example, in the VR mode, the electronic device 300 may anchor the position of the virtual object (e.g., 310-1, 310-2, and 310-3) based on a position in the virtual world corresponding to the position of the user. In this example, when the user views the anchored position of the virtual object (e.g., 310-1, 310-2, and 310-3) in the virtual world, the electronic device 300 may control the display module (e.g., 205 and 210) to display the virtual object (e.g., 310-1, 310-2, and 310-3). In this example, when the user does not view the anchored position of the virtual object (e.g., 310-1, 310-2, and 310-3) in the virtual world, the electronic device 300 may control the display module (e.g., 205 and 210) not to display the virtual object (e.g., 310-1, 310-2, and 310-3). The electronic device 300 may control the display module (e.g., 205 and 210) to display partially the virtual object (e.g., 310-1, 310-2, and 310-3) of which the position is anchored, based on the gazed direction of the user and the viewing range of the user in the virtual world.

The electronic device 300 may anchor the position of the virtual object (e.g., 310-1, 310-2, and 310-3), using various known position anchoring methods in addition to the position anchoring method described above.

In the preceding example, the anchored position of the virtual object (e.g., 310-1, 310-2, and 310-3) in the real world or the virtual world may represent a determined position of the virtual object (e.g., 310-1, 310-2, and 310-3) in the real world or virtual world. For example, the electronic device 300 may anchor the position of the virtual object (e.g., 310-1, 310-2, and 310-3) in the real world or the virtual world, and control the display module (e.g., 205 and 210) to display the virtual object (e.g., 310-1, 310-2, and 310-3) at the anchored position.

According to an embodiment, the processor 120 of the electronic device 300 may determine, or anchor, a position of a virtual object (e.g., 310-1, 310-2, and 310-3) to be displayed via the display module (e.g., 205 and 210) in the real world or the virtual world. According to an embodiment, an application (e.g., the application 146) being executed in association with the virtual object (e.g., 310-1, 310-2, and 310-3) may determine, or anchor, the position of the virtual object (e.g., 310-1, 310-2, and 310-3) to be displayed via the display module (e.g., 205 and 210) in the real world or the virtual world.

For example, in a case where a first surface is included in the FOV of the user, the electronic device 300 may control the display module (e.g., 205 and 210) to display first information on the first surface at the anchored position of the virtual object (e.g., 310-1, 310-2, and 310-3). For example, in a case where a second surface is included in the FOV of the user, the electronic device 300 may control the display module (e.g., 205 and 210) to display second information on the second surface at the anchored position of the virtual object (e.g., 310-1, 310-2, and 310-3).

For example, the electronic device 300 may execute an application 146 (e.g., the application 146 of FIG. 1) stored in a memory (e.g., the memory 130 of FIG. 1). For example, the electronic device 300 may control the display module (e.g., 205 and 210) to display the virtual object (e.g., 310-1, 310-2, and 310-3) according to the executed application 146.

A virtual object (e.g., 310-1, 310-2, and 310-3) may include a plurality of faces. For example, the virtual object (e.g., 310-1, 310-2, and 310-3) may be displayed on the display module (e.g., 205 and 210) in a shape having a plurality of faces according to its form.

For example, the plurality of faces of the virtual object (e.g., 310-1, 310-2, and 310-3) may include at least one first surface for providing information to the user. For example, in a case where the executed application 146 is a messaging application 146, an interface of the messaging application 146 may be provided through the first surface.

The first surface of the virtual object (e.g., 310-1, 310-2, and 310-3) may refer to a face of the virtual object (310-1, 310-2, and 310-3) for providing the interface according to the executed application 146. The first information may refer to information provided via the interface of the executed application 146.

For example, the plurality of faces of the virtual object (e.g., 310-1, 310-2, and 310-3) may include at least one second surface for providing a set video, image, icon, and the like. For example, in a case where the executed application 146 is a messaging application 146, at least one of a set video, image, or icon of the messaging application 146 may be provided through the second surface.

The second surface of the virtual object (e.g., 310-1, 310-2, and 310-3) may refer to a face of the virtual object (e.g., 310-1, 310-2, and 310-3) that is represented as the set video, image, or icon. The first information may refer to information provided via the interface of the executed application 146.

The electronic device 300 may execute various applications 146 other than the messaging application 146 of the preceding example, and control the display module (e.g., 205 and 210) to display the virtual object (e.g., 310-1, 310-2, and 310-3) according to the executed applications 146. The electronic device 300 may control the display module (e.g., 205 and 210) to display the virtual object (e.g., 310-1, 310-2, and 310-3) according to an operating system (OS) (e.g., the OS 142 of FIG. 1), middleware (e.g., the middleware 144 of FIG. 1), and the like.

As shown in FIG. 3, at the position of the user, the user may recognize the first surface of the virtual object (e.g., 310-1, 310-2, and 310-3). The second surface of the virtual object (e.g., 310-1, 310-2, and 310-3) may not be included in the FOV of the user from the position of the user when the virtual object (e.g., 310-1, 310-2, and 310-3) is anchored.

FIG. 3 illustrates an example case in which the electronic device 300 controls the display module (e.g., 205 and 210) to display a plurality of virtual objects 310-1, 310-2, and 310-3 in the form of a plate or window. However, the form or shape of the virtual objects 310-1, 310-2, and 310-3 is not limited to the form or shape of the virtual objects 310-1, 310-2, and 310-3 shown in FIG. 3, and the virtual objects 310-1, 310-2, and 310-3 may be provided in various shapes such as an octahedron, a sphere, and the like.

Figure 4:
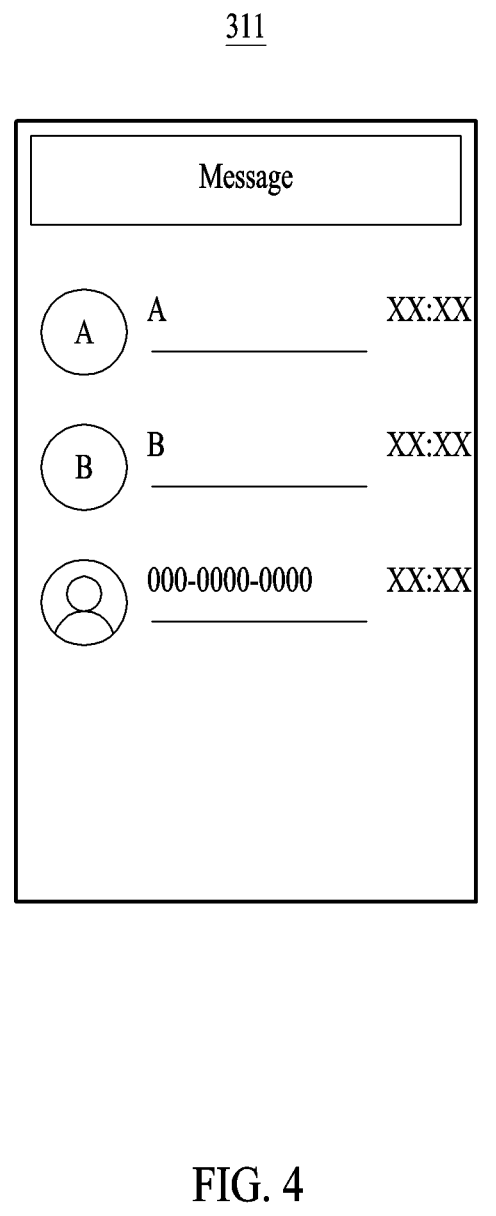

FIG. 4 is a diagram illustrating an example first surface 311 of a virtual object (e.g., the virtual objects 310-1, 310-2, and 310-3 of FIG. 3) according to various embodiments.

In an embodiment, an electronic device (e.g., the electronic device 300 of FIG. 3) may control a display module (e.g., the display module 160 of FIG. 1, and the first display 205 and the second display 210 of FIG. 2) to provide first information via a first surface 311 of a virtual object (e.g., 310-1, 310-2, and 310-3). FIG. 4 shows the first surface 311 of the virtual object (e.g., 310-1, 310-2, and 310-3) that provides an interface of a messaging application (e.g., the application 146 of FIG. 1) executed on the electronic device 300. As shown in FIG. 4, the electronic device 300 may provide the first information including a message sender, a message, a time of receipt of the message, and the like, via the first surface 311 of the virtual object (e.g., 310-1, 310-2, and 310-3).

FIG. 4 illustrates an example of providing an interface for providing received messages of an executed messaging application via the first surface 311 of the virtual object (e.g., 310-1, 310-2, and 310-3), but the first information provided by the electronic device 300 via the first surface 311 of the virtual object (e.g., 310-1, 310-2, and 310-3) is not limited to the example shown in FIG. 4. For example, the electronic device 300 may provide various interfaces provided by the messaging application, such as, for example, an interface for sending messages, an interface for managing received messages, and the like, via the first surface 311 of the virtual object (e.g., 310-1, 310-2, and 310-3). For example, the electronic device 300 may execute various applications 146, such as, for example, an email application, an album application, and the like, and provide interfaces of the executed applications 146 via the first surface 311 of the virtual object (e.g., 310-1, 310-2, and 310-3).

For example, the content of the first information provided via the first surface 311 of the virtual object (e.g., 310-1, 310-2, and 310-3) may change. For example, the first information may change based on an operation of the application 146 associated with the virtual object (e.g., 310-1, 310-2, and 310-3), for example, in a case where a notification occurs on the executed application 146, information provided by the application 146 onto the first surface 311 is updated, the interface provided by the application 146 onto the first surface 311 is changed, and the like.

For example, in a case where the executed application 146 is a messaging application, in response to a new message being received, the content of the first information may be changed such that an interface of the messaging application displays the new message as shown in FIG. 4. For example, when the content of the first information is changed, the electronic device 300 may provide a notification using at least one of the display module (e.g., 205 and 210), an audio module (e.g., the audio module 170 of FIG. 1), and a haptic module (e.g., the haptic module 179 of FIG. 1), or a combination thereof. For example, the electronic device 300 may control the display module (e.g., 205 and 210) to provide the notification via the virtual object (e.g., 310-1, 310-2, and 310-3).

Although the example in which the first information is changed in response to an operation of the application 146 has been described above, the first information may also be changed depending on a program, OS, and the like associated with a virtual object (e.g., 310-1, 310-2, and 310-3).

Figure 5:
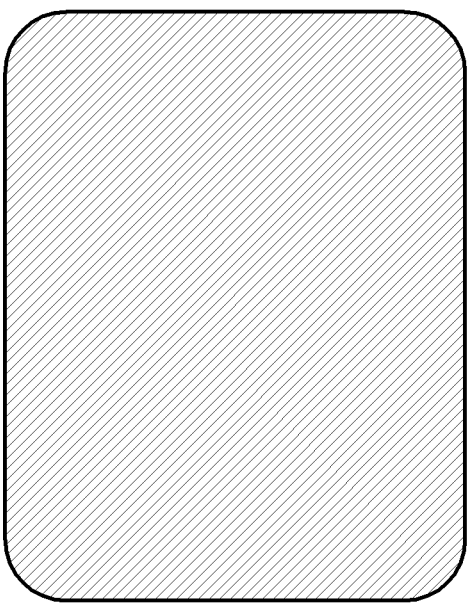
FIG. 5 is a diagram illustrating an example second surface of a virtual object according to various embodiments.

FIG. 5 is a diagram illustrating an example second surface 312 of a virtual object (e.g., the virtual objects 310-1, 310-2, and 310-3 of FIG. 3) according to various embodiments.

In an embodiment, an electronic device (e.g., the electronic device 300 of FIG. 3) may control a display module (e.g., the display module 160 of FIG. 1, and the first display 205 and the second display 210 of FIG. 2) to provide second information via a second surface 312 of a virtual object (e.g., 310-1, 310-2, and 310-3). FIG. 5 shows the second surface 312 of the virtual object (e.g., 310-1, 310-2, and 310-3) on which a set image is provided by the electronic device 300.

The second information provided by the electronic device 300 via the second surface 312 of the virtual object (e.g., 310-1, 310-2, and 310-3) is not limited to the example shown in FIG. 5. For example, the second information may include a translucent or blurred image, a fixed color image, an outline of the second surface 312 of the virtual object (e.g., 310-1, 310-2, and 310-3), a user-specified color image, a primary color specified for an application (e.g., the application 146), a user-specified image/video, an image of an icon of an executed application 146, and the like.

Figure 6:
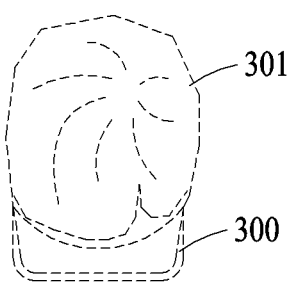
FIG. 6 is a diagram illustrating an example operation performed by an electronic device to provide first information using a second surface of a virtual object according to various embodiments.
Figure 6:
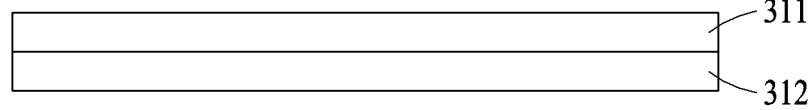
Figure 6:
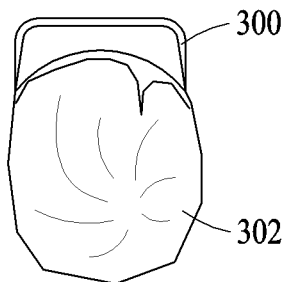

FIG. 6 is a diagram illustrating an example operation performed by an electronic device (e.g., the electronic device 300 of FIG. 3) to provide first information using a second surface (e.g., the second surface 312 of FIG. 5) of a virtual object (e.g., the virtual objects 310-1, 310-2, and 310-3 of FIG. 3) according to various embodiments. FIG. 6 illustrates an example operation of the electronic device 300 performed in a case where, after controlling a display module (e.g., 205 and 210) to display a virtual object (e.g., the virtual objects 310-1, 310-2, and 310-3 of FIG. 3) at a determined position in a real world or virtual world when a user wearing the electronic device 300 is positioned at a first position 301, the user wearing the electronic device 300 has moved to a second position 302.

For example, the electronic device 300 may identify a position of the user and/or a position of the electronic device 300 in the real world or the virtual world. Because the electronic device 300 operates while worn on the user, the position of the electronic device 300 may be substantially the same as the position of the user.

As shown in FIG. 6, the electronic device 300 may control the display module (e.g., 205 and 210) to display the virtual object (e.g., 310-1, 310-2, and 310-3) at the determined position in the real world or the virtual world from the first position 301 of the user. For example, the electronic device 300 may anchor the position of the virtual object (e.g., 310-1, 310-2, and 310-3) to a position within a FOV of the user from the first position 301.

For example, the electronic device 300 may control the display module (e.g., the display module 160 of FIG. 1, and the first display 205 and the second display 210 of FIG. 2) such that the first surface 311 is disposed to face the first position 301. The electronic device 300 may control the display module (e.g., 205 and 210) such that the second surface 312 is disposed to face opposite the first position 301.

For example, the electronic device 300 may dispose the virtual object (e.g., 310-1, 310-2, and 310-3) at the anchored position of the virtual object (e.g., 310-1, 310-2, and 310-3) such that the first surface 311 faces the first position 301. For example, the electronic device 300 may dispose the first surface 311 of the virtual object (e.g., 310-1, 310-2, and 310-3) such that the first surface 311 is within the FOV of the user at the first position 301, for example, the first surface 311 of the virtual object (e.g., 310-1, 310-2, and 310-3) faces a direction of 12 o'clock as shown in FIG. 6.

For example, the electronic device 300 may dispose the virtual object (e.g., 310-1, 310-2, and 310-3) at the position of the virtual object (e.g., 310-1, 310-2, and 310-3) anchored such that the second surface 312 faces opposite the first position 301, for example, dispose the second surface 312 to face a direction of 6 o'clock as shown in FIG. 6. For example, the electronic device 300 may dispose the second surface 312 of the virtual object (e.g., 310-1, 310-2, and 310-3) such that the second surface 312 is not included in a viewing range of the user at the first position 301, for example, dispose the second surface 312 to face the direction of 6 o'clock as shown in FIG. 6.

For example, at the first position 301, the electronic device 300 may control the display module (e.g., 205 and 210) to display the first information on the first surface 311 included in the FOV of the user.

For example, at the first position 301, the electronic device 300 may control the display module (e.g., 205 and 210) to display the second information on the second surface 312 included in the FOV of the user.

For example, the electronic device 300 may determine a gaze direction of the user based on the position of the user in the real world or virtual world. For example, the electronic device 300 may determine the gaze direction of the user, using a camera module (e.g., the camera module 180 of FIG. 1, and the second cameras 275a and 275b of FIG. 2). For example, the electronic device 300 may use the camera module (e.g., 275a and 275b) to detect the pupils of the eyes of the user and track the gaze direction of the user.

For example, in response to the gaze direction of the user being a direction corresponding to the second surface 312, the electronic device 300 may control the display module (e.g., 205 and 210) to display the first information on the second surface 312.

For example, in a case where the user has moved from the first position 301 to the second position 302, the electronic device 300 may determine the gaze direction of the user at the second position 302. In this example, the gaze direction of the user at the second position 302 may be a direction corresponding to the second surface 312 (e.g., a direction of 12 o'clock at the second position 302 as shown in FIG. 6), and the electronic device 300 may control the display module (e.g., 205 and 210) to provide the first information on the second surface 312.

For example, in a case where the gaze direction of the user is the direction corresponding to the second surface 312, and the content of the first information has changed, the electronic device 300 may control the display module (e.g., 205 and 210) to provide the first information on the second surface 312. For example, the first information provided on the second surface 312 may include the changed content. For example, in a case where the gaze direction of the user is the direction corresponding to the second surface 312, and the content of the first information has changed, the electronic device 300 may control the display module (e.g., 205 and 210) to provide third information on the second surface 312. For example, the third information may include the content that has changed from the first information.

For example, in a case where the gaze direction of the user at the second position 302 is the direction corresponding to the second surface 312, and the content provided through the first information has not changed, the electronic device 300 may control the display module (e.g., 205 and 210) to provide the second information on the second surface 312.

For example, in a case where the content provided through the first information has changed, the electronic device 300 may control the display module (e.g., 205 and 210) to display, on the second surface 312, an icon and the like that indicates such a change, update, and the like made in the first information. For example, in a case where the content provided through the first information has changed, the electronic device 300 may provide an acoustic signal, a vibration signal, or the like.

For example, the first information provided through the second surface 312 may include content that has been changed from the content included in the first information that was provided through the first surface 311. For example, the first information provided through the second surface 312 may include an interface associated with the content included in the first information provided through the first surface 311.

For example, in a case where an executed application (e.g., the application 146 of FIG. 1) is a messaging application in the example of FIG. 6, and the user is located at the first position 301, the electronic device 300 may control the display module (e.g., 205 and 210) to display the first information (e.g., the first information shown on the first surface 311 of FIG. 4) on the first surface 311. The electronic device 300 may also control the display module (e.g., 205 and 210) to display the second information (e.g., the second information shown on the second surface 312 of FIG. 5) on the second surface 312.

For example, in a case where the executed application 146 is a messaging application in the example of FIG. 6, and the user is located at the second position 302, the electronic device 300 may control the display module (e.g., 205 and 210) to display the first information on the second surface 312. When the electronic device 300 displays the first information on the second surface 312, the electronic device 300 may provide, on the first surface 311, substantially the same first information or the second information.

For example, the electronic device 300 may use various methods to indicate a change or update in the content of the first information, or a notification from the executed application 146. In this example, the electronic device 300 may control the display module (e.g., 205 and 210) to flash the second surface 312 of the virtual object (e.g., 310-1, 310-2, and 310-3). For example, the electronic device 300 may use a sound output module (e.g., the sound output module 155 of FIG. 1, and the first speaker 255a and the second speaker 255b of FIG. 2) to provide acoustic information. For example, when providing the second information that includes an icon of the executed application 146 on the second surface 312 of the virtual object (e.g., 310-1, 310-2, and 310-3), the electronic device 300 may control the display module (e.g., 205 and 210) to indicate that a notification has occurred using the icon of the application 146.

For example, the electronic device 300 may determine whether the second position 302 of the user is in the direction of the second surface 312 of the virtual object (e.g., 310-1, 310-2, and 310-3). When the second position 302 of the user is in the direction of the second surface 312 of the virtual object (e.g., 310-1, 310-2, and 310-3), the electronic device 300 may control the display module (e.g., 205 and 210) to display the first information on the second surface 312 of the virtual object (e.g., 310-1, 310-2, and 310-3).

Figure 7:
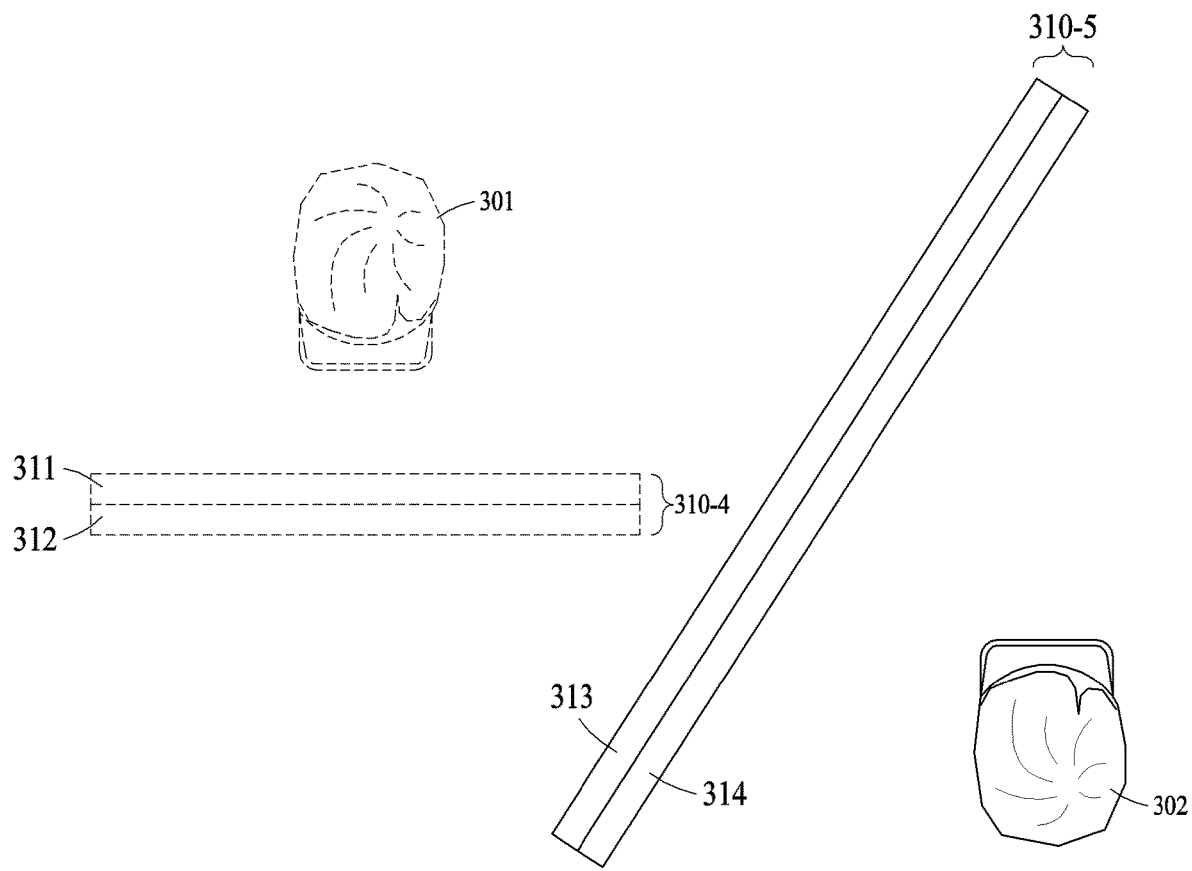
FIG. 7 is a diagram illustrating an example operation performed by an electronic device to provide first information using a second surface of a virtual object with a changed position and size according to various embodiments.

FIG. 7 is a diagram illustrating an example operation performed by an electronic device (e.g., the electronic device 300 of FIG. 3) to provide first information using a second surface 312 of a virtual object 310-5 with a changed position and size according to various embodiments. FIG. 7 illustrates an example case in which the user moves from a first position 301 to a second position 302.

In the example of FIG. 7, in a case where the user is located at the first position 301, the electronic device 300 may control a display module (e.g., 205 and 210) to display a virtual object 310-4 at a determined position in a real world or virtual world.

When the user is located at the first position 301, the electronic device 300 may control the display module (e.g., 205 and 210) to display first information on a first surface 311 of the virtual object 310-4 and second information on a second surface 312 of the virtual object 310-4.

Referring to FIG. 7, the electronic device 300 may control the display module (e.g., 205 and 210) to display the virtual object 310-5 at a position determined based on the second position 302 of the user in the real world or the virtual world.

The electronic device 300 may control the display module (e.g., 205 and 210) to display the first information on the second surface 314 of the virtual object 310-5 at the changed position.

For example, the electronic device 300 may determine whether to control the display module (e.g., 205 and 210) to display the virtual object 310-5 at the position determined based on the second position 302 of the user, based on the first position 301 and the second position 302 of the user, and a direction corresponding to the second surface 312 of the virtual object 310-4.

For example, as shown in FIG. 7, in a case where the user views the second surface 312 from the second position 302, it may not be easy to accurately recognize the first information or the second information provided on the second surface 312, and thus the electronic device 300 may control the display module (e.g., 205 and 210) to display the virtual object 310-5 at a position determined based on the second position 302 of the user.

The electronic device 300 may control the display module (e.g., 205 and 210) to display the virtual object 310-5 at the position determined based on the second position 302 of the user, based on the direction of the second surface 312 and a FOV when the user views the second surface 312.

For example, the electronic device 300 may control the display module (e.g., 205 and 210) to display the virtual object 310-5 between the first position 301 and the second position 302, as shown in FIG. 7. For example, the electronic device 300 may change the position of the virtual object (e.g., 310-1, 310-2, and 310-3) to match a direction in which the first information or the second information is provided on the second surface 314 and a direction from the first position 301 toward the second position 302.

For example, the electronic device 300 may change the size of the virtual object 310-5. For example, the electronic device 300 may change the size of at least one second surface 312 of the virtual object 310-5 based on a position of the user. For example, in response to a distance between the first position 301 and the second position 302 exceeding a preset range, the electronic device 300 may increase the size of the second surface 314 of the virtual object 310-5, as shown in FIG. 7.

For example, in a case where an executed application (e.g., the application 146 of FIG. 1) is a messaging application and a new message is received, the electronic device 300 may provide a notification about the receipt of the message to the second surface 314 of the virtual object 310-5. The electronic device 300 may receive an input from the user via the second surface 314 of the virtual object

310-5 and may provide an interface provided by the messaging application (e.g., an interface for replying to a message, an interface for managing messages, etc.) through the second surface 314 of the virtual object 310-5.

For example, the electronic device 300 may control the display module (e.g., 205 and 210) to display the virtual object 310-5 at a determined position based on the input of the user. For example, in a case where the user checks the first information provided through the second surface 314 of the virtual object 310-5, the electronic device 300 may control the display module (e.g., 205 and 210) to display the virtual object 310-4 at the determined position.

For example, in a case where the executed application 146 is a messaging application and a new message is received, the electronic device 300 may provide the first information to the user located at the second position 302 through the second surface 314 of the virtual object 310-5. The electronic device 300 may then receive an input from the user using the second surface 314 of the virtual object 310-5. In this case, when receiving, from the user, the input indicating that the message has been checked, the electronic device 300 may control the display module (e.g., 205 and 210) to display the virtual object 310-4 at a determined position. When transmitting a replay in response to the received message based on the input from the user, the electronic device 300 may control the display module (e.g., 205 and 210) to display the virtual objects 310-4 at the determined position.

FIG. 7 illustrates an example case where a direction corresponding to the second surface 314 of the virtual object 310-5 faces the second position 302. According to an embodiment, the electronic device 300 may control the display module (e.g., 205 and 210) such that a direction corresponding to a first surface 313 of the virtual object 310-5 faces the second position 302, at the changed position. The electronic device 300 may control the display module (e.g., 205 and 210) to provide the first information onto the first surface 313 of the virtual object 310-5.

Figure 8:
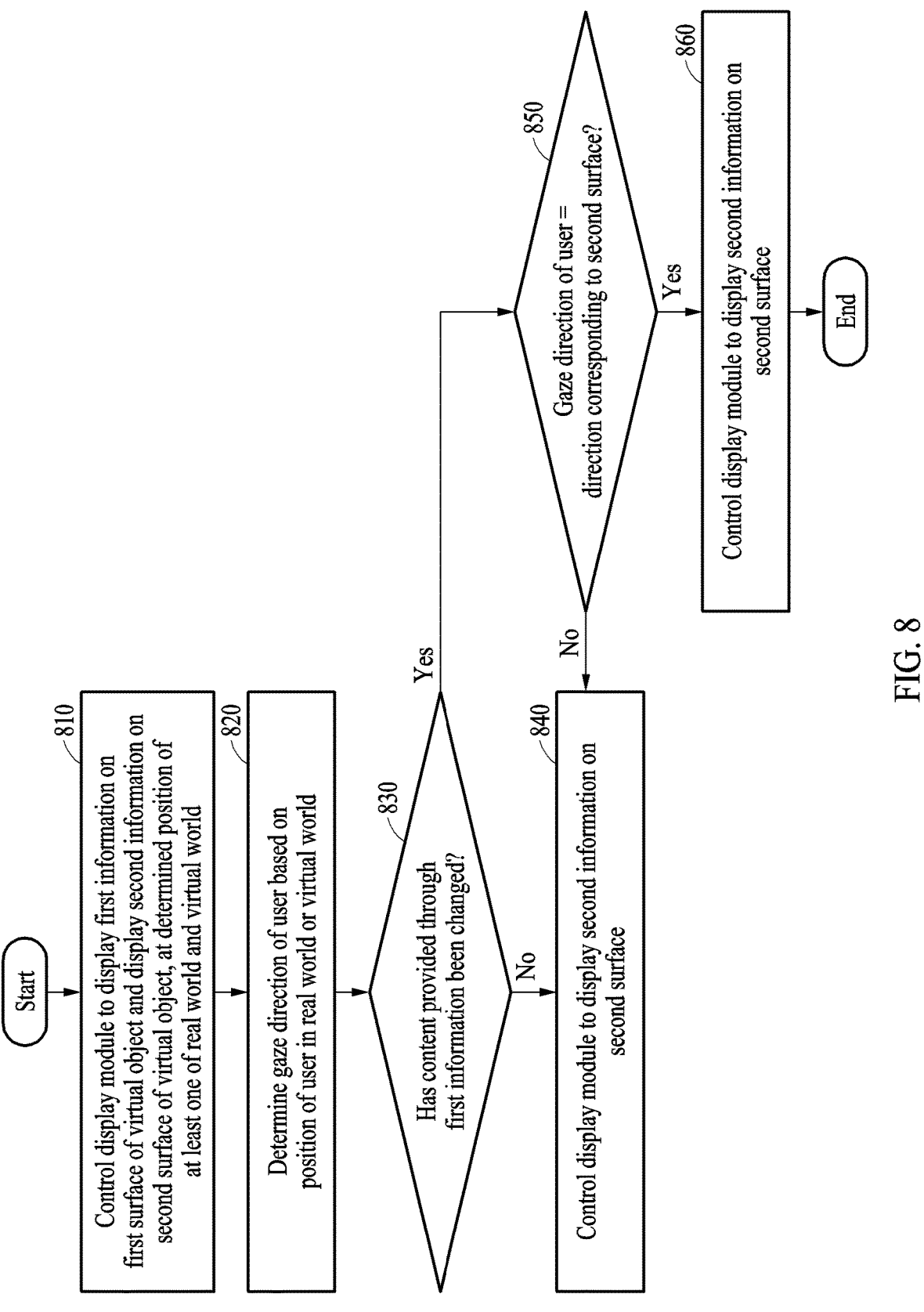
FIG. 8 is a flowchart illustrating an example method of controlling a display module according to various embodiments.

FIG. 8 is a flowchart illustrating an example method of controlling a display module (e.g., the display module 160 of FIG. 1, and the first display 205 and the second display 210 of FIG. 2) according to various embodiments.

In an embodiment, at operation 810, an electronic device (e.g., the electronic device 300 of FIG. 3) may control a display module (e.g., 205 and 210) to display first information on a first surface (e.g., the first surface 311 of FIG. 6) of a virtual object (e.g., the virtual objects 310-1, 310-2, and 310-3 of FIG. 3) and display second information on a second surface (e.g., the second surface 312 of FIG. 6) of the virtual object (e.g., the virtual objects 310-1, 310-2, and 310-3 of FIG. 3), at a determined position in at least one of a real world or virtual world.

For example, the first information provided on the first surface 311 may include an interface of an executed application (e.g., the application 146 of FIG. 1). For example, the content included in the first information may be changed or updated.

For example, the second information provided on the second surface 312 may include preset videos, images, icons, and the like.

In an embodiment, at operation 820, the electronic device 300 may determine a gaze direction of the user based on a position of the user in the real world or the virtual world. For example, the electronic device 300 may track and/or identify the gaze direction of the user, using a camera module (e.g., the camera module 180 of FIG. 1, and the second cameras 275a and 275b of FIG. 2).

In an embodiment, at operation 830, the electronic device 300 may determine whether the content provided through the first information has changed, and at operation 840, the electronic device 300 may determine whether the gaze direction of the user is a direction corresponding to the second surface 312.

In an embodiment, at operation 850, in a case where the content provided through the first information has changed (yes in operation 830) and the gaze direction of the user is the direction corresponding to the second surface 312 (yes in operation 850) at operation 830 and operation 840, the electronic device 300 may control the display module (e.g., 205 and 210) to provide the first information on the second surface 312 of the virtual object (e.g., 310-1, 310-2, and 310-3).

In an embodiment, at operation 840, in a case where content provided through the first information has not changed (no in operation 830) and the gaze direction of the user is not the direction corresponding to the second surface 312 at operation 830 and/or operation 840, the electronic device 300 may control the display module (e.g., 205 and 210) to display the second information on the second surface 312 of the virtual object (e.g., 310-1, 310-2, and 310-3).

Figure 9:
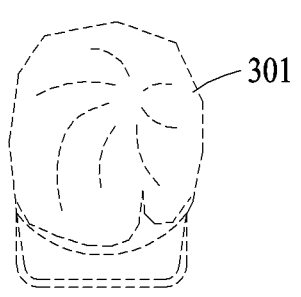
FIG. 9 is a diagram illustrating an example operation performed by an electronic device to provide first information using a second virtual object according to various embodiments.
Figure 9:
Figure 9:
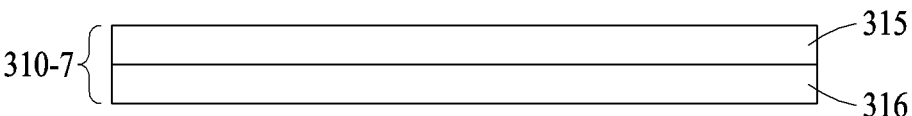
Figure 9:
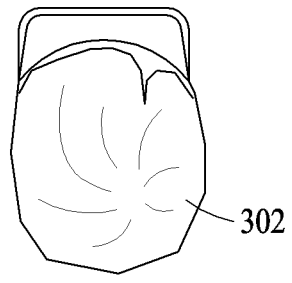

FIG. 9 is a diagram illustrating an example operation performed by an electronic device (e.g., the electronic device 300 of FIG. 3) to provide first information using a second virtual object 310-7 (e.g., the virtual objects 310-1, 310-2, and 310-3 of FIG. 3) according to various embodiments. FIG. 9 illustrates an example in which the electronic device 300 may control a display module (e.g., 205 and 210) to display a virtual object 310-6 when a user wearing the electronic device 300 is located at a first position 301. In the example, the electronic device 300 may control the display module (e.g., 205 and 210) to display first information on a first surface 311 of the virtual object 310-6 and display second information on a second surface 312 of the virtual object 310-6.

In this case, when the user wearing the electronic device 300 moves to a second position 302, the electronic device 300 may control the display module (e.g., 205 and 210) to display the second virtual object 310-7. For example, in a case where the content included in the first information has changed and a distance between the first position 301 and the second position 302 exceeds a preset range, the electronic device 300 may control the display module (e.g., 205 and 210) to display the second virtual object 310-7 that is substantially identical to the virtual object 310-6.

For example, a first surface 315 of the second virtual object 310-7 may be substantially identical to the first surface 311 of the virtual object 310-6, and a second surface 316 of the second virtual object 310-7 may be substantially identical to the second surface 312 of the virtual object 310-6. For example, the electronic device 300 may control the display module (e.g., 205 and 210) to display the first information on the second surface 316 of the second virtual object 310-7.

For example, in a case where the distance between the first position 301 and the second position 302 exceeds the preset range, even when the second position 302 is located in a direction of the first surface 311 of the virtual object 310-6, the electronic device 300 may control the display module (e.g., 205 and 210) to display the second virtual object 310-7.

In an embodiment, the electronic device 300 may receive an input from the user using the second virtual object 310-7. Based on the received input, the electronic device 300 may control the display module (e.g., 205 and 210) to display third information using the second virtual object 310-7. For example, the third information may include an interface provided by an executed application (e.g., the application 146 of FIG. 1). For example, the third information may refer to an interface provided in response to an input of the user from the interface provided by the application 146 included in the first information.

For example, in a case where the executed application 146 is a messaging application and a new message is received, the electronic device 300 may provide a notification of receipt of the message, using the second virtual object 310-7. When receiving an input for replying to the message from the user, the electronic device 300 may control the display module (e.g., 205 and 210) to display the third information including an interface for writing a reply to the message. For example, the electronic device 300 may control the display module (e.g., 205 and 210) to display the third information on the first surface 315 or the second surface 316 of the second virtual object 310-7.

For example, the electronic device 300 may control the display module (e.g., 205 and 210) to provide the first information onto the first surface 315 or the second surface 316 of the second virtual object 310-7, without displaying the virtual object 310-6. For example, when providing the first information using the second virtual object 310-7, the electronic device 300 may control the display module (e.g., 205 and 210) such that the virtual object 310-6 is not displayed, even when the user views a direction of the virtual object 310-6.

For example, the electronic device 300 may control the display module (e.g., 205 and 210) to provide the first information onto the first surface 315 or the second surface 316 of the second virtual object 310-7 and display the virtual object 310-6. For example, even when providing the first information using the second virtual object 310-7, the electronic device 300 may control the display module (e.g., 205 and 210) to display the virtual object 310-6 when the user views the direction of the virtual object 310-6.

The electronic device 300 may control the display module (e.g., 205 and 210) to terminate outputting the second virtual object 310-7 based on the received input.

Figure 10:
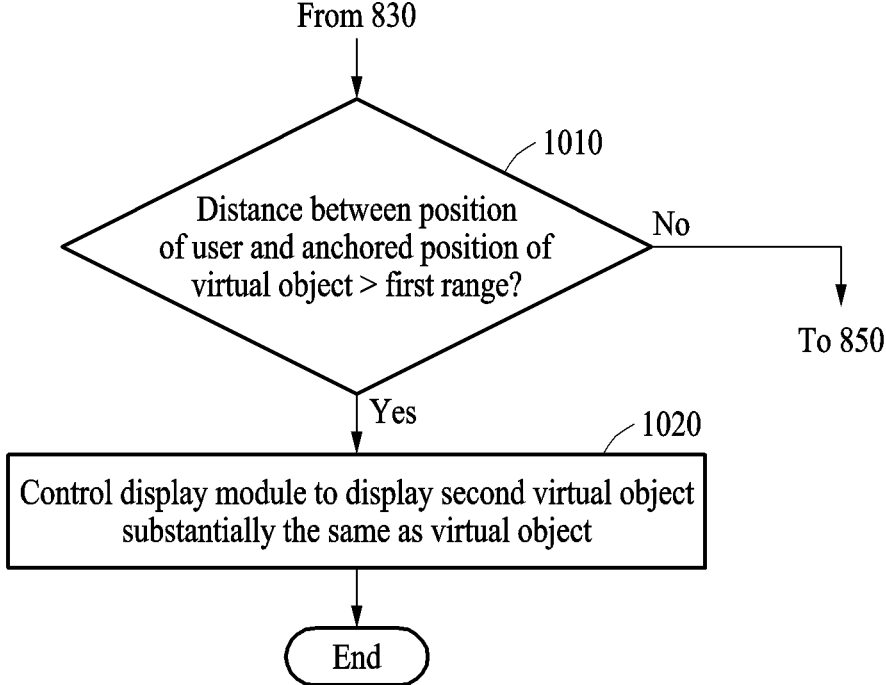
FIG. 10 is a flowchart illustrating an example method of controlling a display module that provides first information using a second virtual object according to various embodiments.

FIG. 10 is a flowchart illustrating an example method of controlling a display module (e.g., the display module 160 of FIG. 1, and the first display 205 and the second display 210 of FIG. 2) that provides first information using a second virtual object (e.g., the second virtual object 310-7 of FIG. 9) according to various embodiments.

In an embodiment, at operation 1010, an electronic device (e.g., the electronic device 300 of FIG. 3) may compare a distance between a position (e.g., the second position 302 of FIG. 9) of the user and a position of a virtual object (e.g., the virtual object 310-6 of FIG. 9) to a preset (e.g., specified) first range.

For example, at operation 1020, in response to the distance between the position 302 of the user and the position of the virtual object 310-6 exceeding the preset first range, the electronic device 300 may control the display module (e.g., 205 and 210) to display a second virtual object 310-7 that is substantially identical to the virtual object 310-6.

In the embodiment of FIG. 8 or 10, the operations may be performed sequentially but may not necessarily be performed sequentially. For example, the order of the operations may be changed, and at least two of the operations may be performed in parallel.

According to an embodiment, the operations described above with reference to FIG. 8 or 10 may be understood as being performed by the processor 120 (e.g., the processor 120 of FIG. 1) of the electronic device 300.

According to various example embodiments, an electronic device (e.g., the electronic device 101 of FIG. 1, the electronic device 200 of FIG. 2, and the electronic device 300 of FIG. 3) may include: a display module including a display (e.g., the display module 160 of FIG. 1, and the first display 205 and the second display 210 of FIG. 2); at least one processor, comprising processing circuitry (e.g., the processor 120 of FIG. 1); and memory (e.g., the memory 130 of FIG. 1) storing instructions executable by the processor. When the instructions are executed by the at least one processor individually or collectively, cause the electronic device to control the display module (e.g., 205 and 210) to display first information on at least one first surface (e.g., the first surface 311 of FIG. 3) of a virtual object (e.g., the virtual objects 310-1, 310-2, and 310-3 of FIG. 3) and second information on at least one second surface (.g., the second surface 312 of FIG. 6) of the virtual object (e.g., 310-1, 310-2, and 310-3), at a determined position in at least one of a real world or a virtual world. When the instructions are executed by the at least one processor individually or collectively, cause the electronic device to determine a gaze direction of a user, based on a position of the user in the real world or the virtual world. In response to the gaze direction of the user being a direction corresponding to the at least one second surface, when the instructions are executed by the at least one processor individually or collectively, cause the electronic device to control the display module (e.g., 205 and 210) to display the first information on the at least one second surface.

In response to a distance between the position of the user and the determined position exceeding a specified first range, when the instructions are executed by the at least one processor individually or collectively, cause the electronic device to control the display module (e.g., 205 and 210) to display the first information using a second virtual object substantially identical to the virtual object (e.g., 310-1, 310-2, and 310-3).

When the instructions are executed by the at least one processor individually or collectively, cause the electronic device to receive an input from the user using the second virtual object; and in response to the input, control the display module (e.g., 205 and 210) to display third information using the second virtual object or terminate outputting the second virtual object.

When the instructions are executed by the at least one processor individually or collectively, cause the electronic device to control the display module (e.g., 205 and 210) to display the virtual object (e.g., 310-1, 310-2, and 310-3) at a position determined based on the position of the user in at least one of the real world or the virtual world.

When the instructions are executed by the at least one processor individually or collectively, cause the electronic device to control the display module (e.g., 205 and 210) such that a direction in which the at least one second surface is displayed is changed based on the position of the user or a size in which the at least one second surface is displayed is changed based on the distance between the position of the user and the determined position.

Based on content included in the first information changing, when the instructions are executed by the at least one processor individually or collectively, cause the electronic device to control the display module (e.g., 205 and 210) to display the first information that is changed on the at least one second surface.

According to various example embodiments, an electronic device (e.g., the electronic device 101 of FIG. 1, the electronic device 200 of FIG. 2, and the electronic device 300 of FIG. 3) may include: a display module including a display (e.g., the display module 160 of FIG. 1, and the first display 205 and the second display 210 of FIG. 2); at least one processor, comprising processing circuitry (e.g., the processor 120 of FIG. 1); and memory (e.g., the memory 130 of FIG. 1) storing instructions executable by the processor, wherein when the instructions are executed by the at least one processor individually or collectively, cause the electronic device to: identify a first position (e.g., the first position 301 of FIG. 6) of a user in at least one of a real world or a virtual world; control the display module (e.g., 205 and 210) to display first information on at least one first surface (e.g., the first surface 311 of FIG. 6) of a virtual object (e.g., the virtual objects 310-1, 310-2, and 310-3 of FIG. 3) and second information on at least one second surface (e.g., the second surface 312 of FIG. 6) of the virtual object (e.g., 310-1, 310-2, and 310-3), at a determined position in the real world or the virtual world, in response to the first position; identify a second position (e.g., the second position 302 of FIG. 6) of the user in the real world or the virtual world; and in response to a gaze direction of the user being a direction corresponding to the at least one second surface, control the display module (e.g., 205 and 210) to display the first information on the at least one second surface, based on a distance and direction between the determined position and the second position.

In response to the distance between the second position and the determined position exceeding a specified first range, when the instructions are executed by the at least one processor individually or collectively, cause the electronic device to control the display module (e.g., 205 and 210) to display the first information using a second virtual object substantially identical to the virtual object (e.g., 310-1, 310-2, and 310-3).

When the instructions are executed by the at least one processor individually or collectively, cause the electronic device to receive an input from the user, using the second virtual object; and in response to the input, control the display module (e.g., 205 and 210) to display third information using the second virtual object or terminate outputting the second virtual object.

When the instructions are executed by the at least one processor individually or collectively, cause the electronic device to control the display module (e.g., 205 and 210) to display the virtual object (e.g., 310-1, 310-2, and 310-3) at a position determined based on the position of the user in at least one of the real world or the virtual world.

When the instructions are executed by the at least one processor individually or collectively, cause the electronic device to control the display module (e.g., 205 and 210) such that a direction in which the at least one second surface is changed based on the second position or a size in which the at least one second surface is displayed is changed based on a distance between the position of the user and the determined position.

According to various example embodiments, a method for controlling a display module may include: controlling a display module (e.g., the display module 160 of FIG. 1, and the first display 205 and the second display 210 of FIG. 2) to display first information on at least one first surface (e.g., the first surface 311 of FIG. 6) of a virtual object (e.g., the virtual objects 310-1, 310-2, and 310-3 of FIG. 3) and second information on at least one second surface (e.g., the second surface 312 of FIG. 6) of the virtual object (e.g.,

310-1, 310-2, and 310-3), at a determined position in at least one of a real world or a virtual world; determining a gaze direction of a user, based on a position of the user in the real world or the virtual world; and in response to the gaze direction of the user being a direction corresponding to the at least one second surface, controlling the display module (e.g., 205 and 210) to display the first information on the at least one second surface.

The controlling the display module (e.g., 205 and 210) to display the first information on the at least one second surface may include: controlling the display module (e.g., 205 and 210) to display the first information using a second virtual object substantially identical to the virtual object (e.g., 310-1, 310-2, and 310-3), in response to a distance between the position of the user and the determined position exceeding a specified first range.

The display module controlling method may further include: receiving an input from the user, using the second virtual object; and in response to the input, controlling the display module (e.g., 205 and 210) to display third information using the second virtual object or terminate outputting the second virtual object.

The controlling the display module (e.g., 205 and 210) to display the first information on the at least one second surface may include controlling the display module (e.g., 205 and 210) to display the virtual object (e.g., 310-1, 310-2, and 310-3) at a position determined based on the position of the user in at least one of the real world or the virtual world.

The controlling the display module (e.g., 205 and 210) to display the first information on the at least one second surface may include controlling the display module (e.g., 205 and 210) such that a direction in which the at least one second surface is displayed is changed based on the position of the user or a size in which the at least one second surface is displayed is changed based on the distance between the position of the user and the determined position.

The controlling the display module (e.g., 205 and 210) to display the first information on the at least one second surface may include controlling the display module (e.g., 205 and 210) to display, on the at least one second surface, the first information changed based on content included in the first information changing.

According to an example embodiment of the present disclosure, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It is to be understood that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via a third element.

As used in connection with certain embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various embodiments of the present disclosure, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a display module, including a display;
at least one processor, comprising processing circuitry; and
memory electrically storing instructions executable by the at least one processor,
wherein, when the instructions are executed by the at least one processor individually or collectively, cause the electronic device to:
control the display module to display first information on at least one first surface of a first virtual object and second information on at least one second surface of the first virtual object, at a determined position in at least one of a real world or a virtual world;
determine a gaze direction of a user, based on a position of the user in the real world or the virtual world;
determine a changed gaze position of the user in the real world or the virtual world upon movement of the user; and
control the display module based on the changed gaze position,
to generate a second virtual object for providing at least one of the first information and the second information, or
to display the first information on the second surface of the first virtual object.

2. The electronic device of claim 1, wherein when the instructions are executed by the at least one processor individually or collectively, cause the electronic device to:
control the display module to display the first information using the second virtual object substantially identical to the first virtual object, in response to movement of the user exceeding a specified first range.

3. The electronic device of claim 2, wherein when the instructions are executed by the at least one processor individually or collectively, cause the electronic device to:
receive an input from the user using the second virtual object; and
in response to the input, control the display module to display third information using the second virtual object or terminate outputting the second virtual object.

4. The electronic device of claim 1, wherein when the instructions are executed by the at least one processor individually or collectively, cause the electronic device to:
control the display module to display the second virtual object at a position determined based on the changed gaze position of the user in at least one of the real world or the virtual world.

5. The electronic device of claim 1, wherein when the instructions are executed by the at least one processor individually or collectively, cause the electronic device to:
control the display module such that a direction in which the at least one second surface is displayed is changed based on the changed gaze position of the user or a size in which the at least one second surface is displayed is changed based on the a distance between the determined position and the changed gaze position.

6. The electronic device of claim 1, wherein when the instructions are executed by the at least one processor individually or collectively, cause the electronic device to:
based on content comprised in the first information changing, control the display module to display the first information that is changed on the at least one second surface.

7. An electronic device, comprising:
a display module including a display;
at least one processor, comprising processing circuitry; and
memory storing instructions executable by at least one processor,
wherein when the instructions are executed by the at least one processor individually or collectively, cause the electronic device to:
identify a first position of a user in at least one of a real world or a virtual world;
control the display module to display first information on at least one first surface of a first virtual object and second information on at least one second surface of the first virtual object, at a determined position in the real world or the virtual world, in response to the first position;
identify a second position of the user in the real world or the virtual world resulting from movement of the user; and
control the display module based on at least one of a distance between the determined position and the second position and a changed gaze position according to the movement,
to generate a second virtual object for providing at least one of the first information andor the second information or
to display the first information on the second surface of the first virtual object.

8. The electronic device of claim 7, wherein when the instructions are executed by the at least one processor individually or collectively, cause the electronic device to:
in response to the distance between the second position and the determined position exceeding a specified first range, control the display module to display the first information using the second virtual object substantially identical to the virtual object.

9. The electronic device of claim 8, wherein when the instructions are executed by the at least one processor individually or collectively, cause the electronic device to:
receive an input from the user, using the second virtual object; and
in response to the input, control the display module to display third information using the second virtual object or terminate outputting the second virtual object.

10. The electronic device of claim 7, wherein when the instructions are executed by the at least one processor individually or collectively, cause the electronic device to:

control the display module to display the second virtual object at a position determined based on the second position of the user in at least one of the real world or the virtual world.

11. A method of controlling a display module, comprising:

controlling a display module to display first information on at least one first surface of a first virtual object and second information on at least one second surface of the first virtual object, at a determined position in at least one of a real world or a virtual world;

determining a gaze direction of a user, based on a position of the user in the real world or the virtual world;

determine a changed gaze position of the user in the real world or the virtual world upon movement of the user; and controlling the display module, based on the changed gaze position, to generate a second virtual object for providing at least one of the first information and the second information or to display the first information on the second surface of the first virtual object.

12. The method of claim 11, wherein the controlling the display module to display the first information on the at least one second surface comprises:

controlling the display module to display the first information using a second virtual object substantially identical to the virtual object, in response to a distance between the position of the user and the determined position exceeding a specified first range.

13. The method of claim 12, further comprising:

receiving an input from the user, using the second virtual object; and in response to the input, controlling the display module to display third information using the second virtual object or terminate outputting the second virtual object.

14. The method of claim 11, wherein the controlling the display module to display the at least one of the first information and the second information on the at least one second surface of the second virtual object comprises:

controlling the display module to display the second virtual object at a position determined based on the changed position of the user in at least one of the real world or the virtual world.

15. The method of claim 11, wherein the controlling the display module to display the at least one of the first information and the second information on the at least one second surface of the second virtual object comprises:

controlling the display module such that a direction in which the at least one second surface of the second virtual object is displayed is changed based on the position of the user or a size in which the at least one second surface of the second virtual object is displayed is changed based on the distance between the changed position of the user and the determined position.

* * * * *